Oct. 29, 1935.  E. T. ALTMAN  2,019,330
SAW FILING MACHINE
Filed July 21, 1934   2 Sheets-Sheet 2
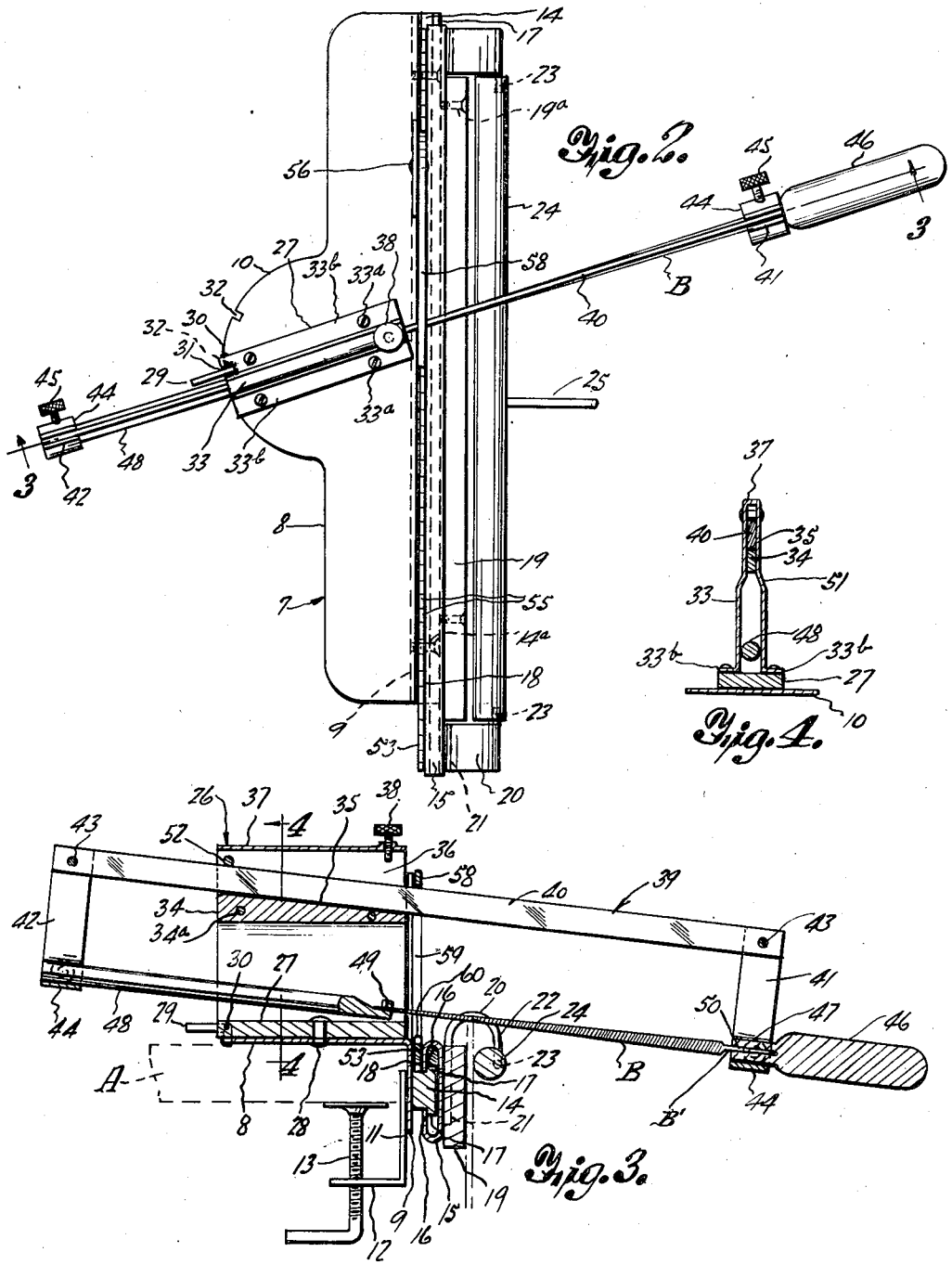
INVENTOR
EDWIN T. ALTMAN
By Laban W. Hazle
ATTORNEY Patented Oct. 29, 1935

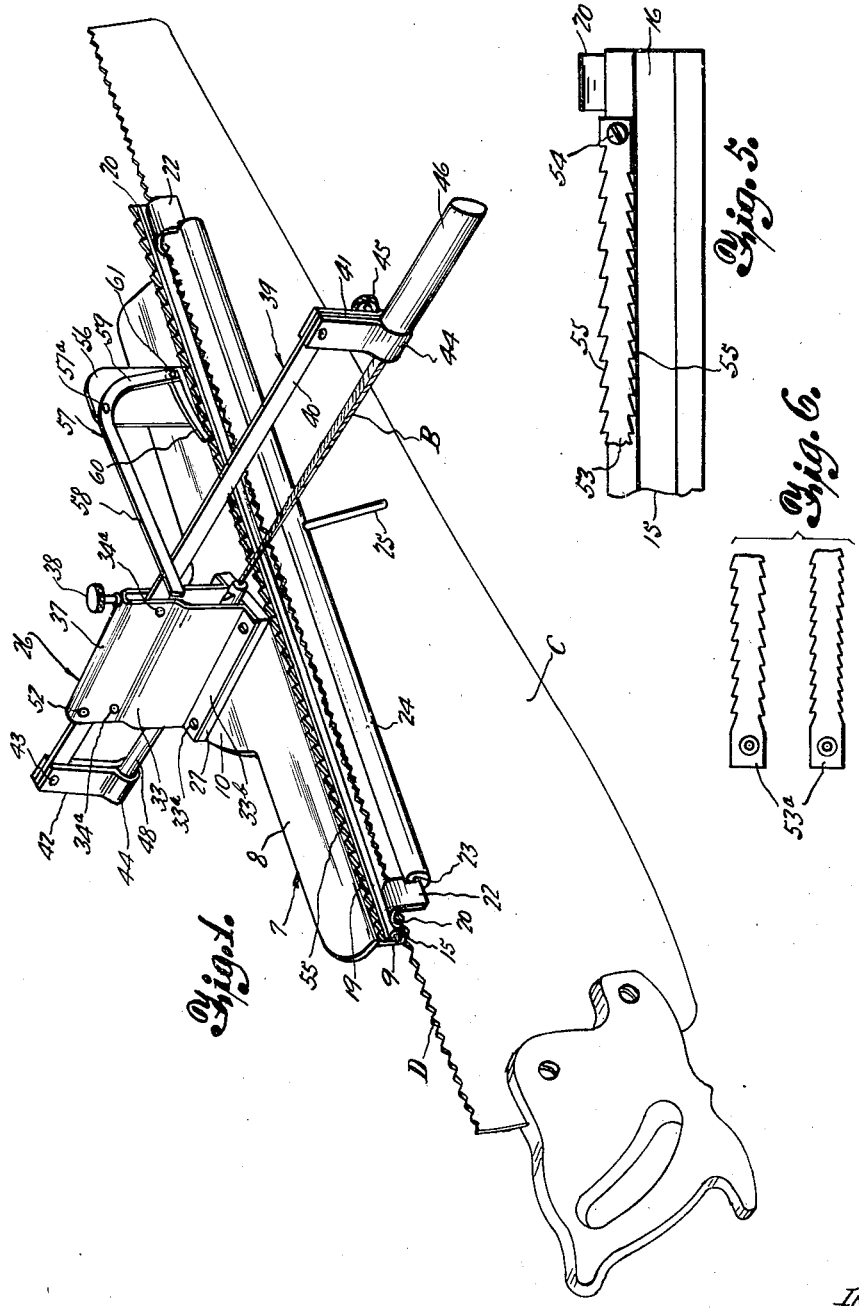

2,019,330

UNITED STATES PATENT OFFICE 2,019,330

SAW FILING MACHINE

Edwin T. Altman, Belle Glade, Fla.

Application July 21, 1934, Serial No. 736,310

4 Claims. (Cl. 76—31)

My invention relates to saw filing machines for filing hand saws and the like.

The main object of my invention is to provide a relatively simple and inexpensive device or machine in which a saw may be mounted and the teeth thereof filed and sharpened rapidly and easily, the saw when once clamped in place being then automatically shifted longitudinally to bring the next tooth in position for filing after the preceding one is finished, and the arrangement being such that the lifting of the file from the finished tooth actuates a shifting mechanism to shift the saw as described.

Another object is to provide a device of this kind in which the shifting mechanism for the saw as set forth includes and is regulated by a ratchet toothed shifting bar which may be readily removed and replaced by another having teeth differently spaced according to the spacing and number of teeth on the saw being filed. Each bar for convenience is toothed along two opposite edges and is reversible to bring either edge into operative position.

Another object is to provide in a saw filing machine of this kind a novel and efficient form of file holder guide by which the file holder is guided both as to longitudinal movement according to the angle at which the saw teeth are to be filed and in a vertical plane to regulate the depth to which each tooth is filed.

A further object is to provide a file holder guide which is reversible to guide the file at two different angles for filing both sides of the saw teeth without removing the saw from the clamp.

Still a further object is to provide a machine of the foregoing characteristics in a simple form, with but few moving parts and comprising simply a stationary frame with a clamp for the bench or table edge, a sliding carriage and saw clamp longitudinally slidable on the stationary frame, a file holder guide swiveled on the stationary frame, a file holder slidably mounted through the guide across the carriage and saw clamp, and a shifting mechanism on the stationary frame engaging a shifting bar affixed to the said carriage.

With these and other objects in view as may appear in the course of the following detailed description and claims, reference is made to the accompanying drawings wherein a practical embodiment of the invention is shown for purposes of exemplification and wherein:

Figure 1 is a perspective view of my saw filing machine with a saw clamped in place for filing.

Figure 2 is a plan view, the saw being removed.

Figure 3 is a section along the line 3—3 in Figure 2.

Figure 4 is a section along the line 4—4 in Figure 3.

Figure 5 is a fragmental inside elevation of one end of the sliding carriage and the attached shifting bar.

Figure 6 is a fragmental elevation of a pair of auxiliary shifting bars having teeth of different sizes and spacing.

Referring now with more particularity to the drawings my invention comprises a stationary frame designated generally at 7 and including an elongated top plate 8 having a lip 9 turned down at right angles along one of its longer edges, this lip being found at which is hereinafter termed the frontal part of the assembly. A semi-circular extension or projection 10 is formed centrally on the rear edge of the top plate 8 for a purpose to be described. An L-shaped bracket 11 is welded or riveted to the rear face of the lip 9 at its center and has one leg 12 extended back and space considerably below the plate 8 and a clamp screw 13 is threaded up through this leg 12 and arranged to engage the underside of the bench or table edge A to clamp the assembly in place thereon in well known manner.

A T-shaped carrier bar or rail 14 is secured by screws 14a along the longitudinal center line of the lip 9 on the frontal side and from end to end thereof and a sliding carriage or bar 15 is slidably mounted on this carrier bar, said carriage having longitudinally extended channels 16 to receive and slidably embrace the head flanges or ribs 17 on the frontal edge of the rail 14 as clearly shown. The carriage 15 may thus slide freely and longitudinally along the carrier rail 14 and may be completely removed by running it off either end. It will be noted that the width of the rail 14 is such that the inner face of the carriage 15 is spaced from the adjacent face of the lip 9 leaving a space or cleft 18 for a purpose to be described.

A fixed saw clamp bar or jaw 19 of flat elongated form and preferably of wood or similar material is secured by screws 19a along the frontal face of the carriage 15 but this jaw terminates at its ends some distance short of the ends of said carriage. Bearing yokes or brackets 20 of inverted U-shaped form are then riveted, welded or otherwise secured by one leg 21 to the exposed ends of the carriage 15 and the other legs 22 thus forwardly disposed are provided with inturned bearing studs 23 on which a long movable saw clamp jaw 24 of circular cross section is eccentrically pivoted at its ends. By turning this clamp jaw 14 downward at its outer side by the radially extended handle 25 the jaw moves inward against the fixed jaw 19 as will be readily apparent.

A file holder guide 26 is provided and comprises a flat rectangular base plate 27 which is centrally pivoted on the top plate 8 by a rivet 28 so that one end of the plate will play over and around the semicircular extension 10 of said top plate, the pivot rivet 28 being located at the center from which the rounded margin of said extension is struck. A dog 29 is pivoted at 30 in a recess 31 formed in the end of the base plate 27 and is adapted to enter any one of a pair of spaced notches 32 formed in the edge of the extension 10 whereby the base plate is locked against rotation and in an adjusted position. An inverted U-shaped cover or housing 33 is mounted on the top of the base plates 27 by screws or rivets 33a through its outwardly turned feet 33b and said housing extends or projects upwardly some distance. A guide plate 34 is secured near the top of the housing 33 by rivets 34a extended through the sides of housing and the upper edge or face 35 of this plate is tapered or sloped angularly toward one end with its lowest end nearest the frontal side of the assembly. A space or passage 36 is left between this upper face 35 of the plate and the bight 37 of the housing 33 and a lift adjusting screw 38 is threaded down through the said bight 37 over the low end of the plate.

The file holder frame shown generally at 39 is of elongated open form with a long top or back bar or rib 40 to the ends of which end pieces 41 and 42 are secured by rivets 43. These end pieces 41 and 42 have eyes 44 formed at their lower extremities and provided with laterally projecting set or thumb screws 45. A handle 46 having a reduced end 47 is mounted by this end in the eye 44 on the frontal end piece 41 and is secured therein by the set screw 45 and a file holder rod 48 is similarly secured in the eye 44 in the rear end piece 42 and extends forwardly toward the frontal end of the frame parallel with the back bar 40. Said file holder rod 48 has a small tapered socket 49 to receive the working end of a three cornered file B of conventional form while the end 47 of the handle 46 has a similar socket 50 to take the handle end B' of the file. By adjusting the rod 48 through the eye 44 a file of any usual length may be engaged and held in the frame as will be readily understood.

This file holder frame is then mounted on the machine by placing the top bar 40 through the passage 36 in the guide housing 33 whereupon, the parts being properly proportioned, the rod 48 and the file B will pass freely through the lower portion of the housing clearing the base plate 27. The lower portion of the housing 33 is widened as shown at 51 to clear the rod and file. The said top bar 40 of the file holder frame is held down against the sloping face of the guide plate 34 at the rear end thereof by a rivet 52 passed through the sides of the housing 33 over the top bar. The frame thus may play freely back and forth through the housing 33 and across the carriage 15 and saw clamping assembly and also may be raised up at its frontal end, the frame tilting then on the rear edge of the guide plate 34 and the extent to which the frame may be raised being regulated by the position of the lift adjusting screw 38.

In the operation of the machine as so far described, the saw C is clamped between the fixed and movable clamp jaws 19 and 24 by manipulating the movable jaw as described, the saw being placed with the toothed edge D uppermost and extended parallel along and above the carriage 15 as shown. The upward arch of the brackets 20 clears the saw edge in this position and by placing the teeth up against the underside of these brackets the saw is held and set in proper position. The file holder guide 26 is adjusted to either of the notches 32 setting the file holder frame 39 at an angle to the saw edge. The file holder frame is then dropped down between any two adjacent teeth of the saw and the file is moved back and forth through the guide 26 filing the edges of these two teeth. The depth of the cut is regulated and made even throughout the length of the saw by first setting the saw in the clamp so that the file frame is elevated somewhat as the file rests between two teeth. Then the cut progresses until the holder is held against further downward tilting by the sloping face 35 of the guide plate 34 and the depth of cut is thus regulated and made even. Since opposite sides of the teeth of a saw are filed at opposite angles all the teeth are first filed on one side with the file holder guide 26 set at one angle and locked in one notch 32 and then the guide is rotated and locked at the other notch 32 reversing this angle and the filing is repeated. This reversing action is performed without removing and reversing the saw as is necessary in other machines. Inasmuch as all saws are generally filed at the same angle the two notches 32 will permit all the necessary adjustment though obviously additional notches for different angles might be provided if desired.

After each valley or throat between two teeth is filed it is then necessary to raise the file and move the saw carriage and clamp through a distance equal to the space between two teeth of the saw to bring the file over the proper next position for filing as will be understood. To automatically perform this moving or shifting of the saw I provide the shifting mechanism now to be described. An elongated shifting bar 53 of a length substantially equal to that of the carriage bar 15 is secured by screws 54 at its ends to the rear, upper and inner face of this bar in the space 18 hereinbefore described. The longitudinal edges of the shifting bar 53 are provided with ratchet teeth 55 and when mounted as described one of these toothed edges is turned up and exposed in the space between the carriage bar and the adjacent lip 9 of the stationary frame 7. A bearing plate or lug 51 is turned upward from or mounted on the top plate 8 off to one side of the file holder guide 26 and substantially in vertical alignment with the lip 9 beneath. A bell crank shifting lever 57 is fulcrumed at 57a on this bearing lug 56 near its upper end and one leg 58 of this lever extends over across the top of the file holder frame 39 adjacent the guide 26. The other and shorter leg 59 of the lever 57 extends downward toward the shifting bar 53 and a pawl 60 is pivoted at one end at 61 to the lower end of this leg 59. The pawl 60 then extends toward the center of the assembly and lies of its own weight at its free end in engagement with the upper toothed edge 55 of the shifting bar 53. The teeth in this upper edge of the bar 53 are spaced apart a distance equal to the space between any two teeth of the saw C. Now each time the file holder frame 39 is raised to raise the file B from a completed cut the top bar 40 will strike and raise the leg 58 of the shifting lever 57 which will then rock on its fulcrum 51a and move the pawl 60 endwise and shift the shifting bar, carriage and saw clamp in that direction. The lift adjusting screw 38 is adjusted so that the distance which the frame 39 may be lifted is just sufficient to shift the parts through a distance equal to one tooth on the shifting bar 53 or two teeth on the saw C. As the file is dropped down into the next position to be filed the weight of the leg 58 of the shifting lever 57 returns the shifting mechanism back to position for the next operation. It will thus be seen that the saw will be automatically shifted the required amount each time a cut is finished by the normal and natural action of removing the file from the completed cut. The shifting bar 53 may have ratchet teeth of any desired length or spacing for use with saws having different numbers of teeth per inch, and since the bars are readily removed by simply removing the screws 54 additional bars such as shown at 53a (Figure 6) with teeth of different length may be used and by a suitable combination and use of the bars a saw of any usual "point" may be filed.

From the foregoing it will be evident that a saw may be filed rapidly and efficiently and with a minimum of labor. While the saw carriage and clamp structure is here shown as being substantially the same length as the stationary frame it is obvious that this length and size may be varied as desired.

While I have herein set forth a certain preferred embodiment of my invention it is understood that I may vary from the same in minor structural details so as best to provide a practical device for the purposes intended within the scope of the appended claims.

I claim:

1. In a saw filing machine, a frame, a carriage and saw clamp slidably mounted on the frame, a file holder guide pivotally mounted in a vertical plane on the frame adjacent the carriage, the said guide including an inverted U-shaped cover member, a tapered guide plate secured in the cover member with its lowest end disposed nearest the said carriage, a file holder frame slidably mounted through the said cover member and including a top bar slidable over the sloping upper edge of the guide plate, and an adjusting screw threaded down through the top of the cover member over the lowest end of the guide plate.

2. In a saw filing machine, a frame, a carriage and saw clamp slidably mounted on the frame, a file holder guide pivotally mounted in a vertical plane on the frame adjacent the carriage, the said guide including an inverted U-shaped cover member, a tapered guide plate secured in the cover member with its lowest end disposed nearest the said carriage, a file holder frame slidably mounted through the said cover member and including a top bar slidable over the sloping upper edge of the guide plate, and an adjusting screw threaded down through the top of the cover member over the lowest end of the guide plate, the said frame having radially spaced notches adjacent the guide, and a dog pivoted on the guide for engagement with the said notches to lock the guide and file holder frame in various angular relationships relative to the carriage and saw clamp.

3. In a saw filing machine, a stationary frame including a top plate and downwardly turned lip along one edge of the top plate, a T-shaped carrier bar mounted along the said lip, a channelled carriage bar slidably mounted on the carrier bar, a fixed saw clamp jaw along the outer face of the carrier bar, ears turned outwardly and over from the ends of the carriage bar, a movable clamp jaw eccentrically pivoted at its ends to the said ears and adapted to move against the fixed clamp jaw to hold a saw in place, a ratchet toothed shifting bar screwed to the carriage bar and extended along the rear of this bar, a file holder guide member including a base swiveled on the top plate of the stationary frame, the said top plate having spaced notches, a dog pivoted on the base plate for engagement with the notches, an inverted U-shaped cover and guide frame secured to the said base plate, a beveled guide plate secured near the top of the cover, an adjusting screw threaded down through the top of the cover over the lowest end of the guide plate, an elongated open file holder frame including a top bar slidably mounted through the holder guide cover over the guide bar and arranged to tilt vertically therein against the adjustment screw, ends turned down from the top bar of the frame, means for securing a file between the said ends of the frame, a handle extended from one of the ends, a bearing ear turned up from the stationary frame alongside the file holder guide, a bell crank operating lever fulcrumed on the bearing ear and overlying the top bar of the file holder frame, and a pawl pivoted to the other end of the operating lever and engaging the teeth on the said shifting bar.

4. In a saw filing machine, a stationary frame, a T-shaped carrier bar secured along one side of the frame, a channelled carriage bar slidably mounted for endwise movement along the carrier bar, a saw clamp mounted upon the carriage bar and including outwardly and downwardly turned ears at the ends of the carriage bar and an elongated clamp jaw eccentrically pivoted at its ends between these ears, a ratchet toothed shifting bar detachably secured to the carriage bar, a file holder guide member pivotally mounted on the frame intermediate the ends thereof and including an inverted U-shaped cover, a beveled guide plate mounted within and adjacent the top of the cover, a file holder frame including a top bar slidably mounted through the cover and across the said guide plate, and adjustment screw threaded down through the top of the cover over the lowermost end of the beveled guide plate, the said file holder frame being tiltable vertically at its ends within the limits set by the guide plate and adjustment screw, a bearing ear on the frame and alongside the said file holder guide member, a bell crank lever fulcrumed on the bearing ear with one end resting on the said top bar of the file holder frame and the other turned down over the said ratchet toothed shifting bar, and a pawl carried by the last mentioned end of the bell crank lever and engaging the teeth on the said shifting bar.

EDWIN T. ALTMAN.